United States Patent
Yamaguchi

(10) Patent No.: US 10,666,044 B2
(45) Date of Patent: May 26, 2020

(54) GROUNDING CIRCUIT, ELECTRICAL DEVICE, GROUNDING CONTROL METHOD, AND GROUNDING CONTROL PROGRAM

(71) Applicant: NEC Corporation, Minato-ku, Tokyo (JP)

(72) Inventor: Shohei Yamaguchi, Tokyo (JP)

(73) Assignee: NEC CORPORATION, Tokyo (JP)

( * ) Notice: Subject to any disclaimer, the term of this patent is extended or adjusted under 35 U.S.C. 154(b) by 4 days.

(21) Appl. No.: 16/303,218

(22) PCT Filed: May 19, 2017

(86) PCT No.: PCT/JP2017/018773
§ 371 (c)(1),
(2) Date: Nov. 20, 2018

(87) PCT Pub. No.: WO2017/204097
PCT Pub. Date: Nov. 30, 2017

(65) Prior Publication Data
US 2019/0207383 A1    Jul. 4, 2019

(30) Foreign Application Priority Data
May 25, 2016 (JP) ................................ 2016-103851

(51) Int. Cl.
*H02H 9/02* (2006.01)
*H02G 9/02* (2006.01)
*H04B 3/44* (2006.01)

(52) U.S. Cl.
CPC ............... *H02H 9/02* (2013.01); *H02G 9/02* (2013.01); *H04B 3/44* (2013.01)

(58) Field of Classification Search
CPC ............... H02H 9/02; H02G 9/02; H04B 3/44
See application file for complete search history.

(56) References Cited

U.S. PATENT DOCUMENTS 5,491,368 A * 2/1996 Yamamoto ............... H04B 3/44
                                                              307/113
6,563,236 B2 * 5/2003 Kumayasu ............... H04B 3/44
                                                              307/112
(Continued)

FOREIGN PATENT DOCUMENTS

CN      201312117 Y      9/2009
CN      103490406 A      1/2014
(Continued)

OTHER PUBLICATIONS

International Search Report for PCT Application No. PCT/JP2017/018773, dated Jul. 11, 2017.
(Continued)

*Primary Examiner* — Jared Fureman
*Assistant Examiner* — Michael J Warmflash

(57) ABSTRACT

[Problem] To suppress current flowing to a contact of a relay when grounding a device to be grounded by connecting the contact of the relay, and to suppress arc discharge between relay contacts when the grounding state of the device to be grounded is released by disconnecting the relay contact.
[Solution] A grounding circuit equipped with: a first relay contact connected to a device to be grounded; a resistor that is connected between the first relay contact and an earth, and that suppresses current flowing to the first relay contact when the contact of the first relay is closed; and a second relay contact that is connected in parallel with the resistor, and that is closed before the first relay contact is opened when the grounding state of the device to be grounded is released.

20 Claims, 6 Drawing Sheets

(56) References Cited

U.S. PATENT DOCUMENTS

| | | | |
|---|---|---|---|
| 10,404,382 B2 * | 9/2019 | Takigawa | H01H 47/001 |
| 2003/0015921 A1 * | 1/2003 | Kumayasu | H04B 3/44 |
| | | | 307/131 |

FOREIGN PATENT DOCUMENTS

| | | |
|---|---|---|
| JP | H04-323917 A | 11/1992 |
| JP | H05-129991 A | 5/1993 |
| JP | H06-104799 A | 4/1994 |
| JP | 2000-341818 A | 12/2000 |
| JP | 2003-032155 A | 1/2003 |

OTHER PUBLICATIONS

English translation of Written opinion for PCT Application No. PCT/JP2017/018773.
Chinese Office Action for CN Application No. 201780031224.0 dated Jun. 27, 2019 with English Translation.

* cited by examiner

GROUNDING CIRCUIT, ELECTRICAL DEVICE, GROUNDING CONTROL METHOD, AND GROUNDING CONTROL PROGRAM

This application is a National Stage Entry of PCT/JP2017/018773 filed on May 19, 2017, which claims priority from Japanese Patent Application 2016-103851 filed on May 25, 2016, the contents of all of which are incorporated herein by reference, in their entirety.

TECHNICAL FIELD

The present invention relates to a grounding circuit, an electrical device, a grounding control method, and a grounding control program that switch a grounded device between being grounded to an earth and being un-grounded from the earth.

BACKGROUND ART

A submarine cable system includes a submarine cable (hereinafter, referred to as "cable"), a submarine repeater, a submarine branching device (hereinafter, referred to as "branching unit" (BU)), terminal equipment (hereinafter, referred to as "terminal"), a power supply device, and the like. The submarine repeater amplifies an attenuated signal. The BU branches a signal toward a plurality of points. The terminal transmits and receives various data signals. The power supply device supplies electric power to a submarine device. Note that the power supply device may supply power at a high voltage exceeding several kilovolts. Further, the BU may have a function of switching a power supply path to the submarine device in order to cope with a grounding fault and a fault repair of the cable, and the like.

One example of a submarine branching device having the function of switching a power supply path is disclosed in PTL 1. In a power supply line switching circuit of PTL 1, a power supply line is switched by power supply current. The power supply line switching circuit of PTL 1 includes a relay, a contact, and a resistor. The relay is connected to the power supply line, and operates depending on power supply current. The contact is closed when the relay does not operate, and is opened when the relay operates. The resistor forms a series circuit together with the contact, and the series circuit is connected in parallel with the relay. Note that, when a resistance value of the relay is r, a resistance value of the resistor is R, a value of current flowing through the power supply line immediately before the relay operates is Ia, and a value of current flowing through the power supply line immediately after the relay operates is Ib, r and R are set in such a way as to establish $(R/(r+R)) \cdot Ia < Ib$. As a result of the above-described configuration, a value of current flowing through the relay after the relay operates does not decrease, and thus, the power supply line switching circuit of PTL 1 reliably switches the power supply line without repeating operation and un-operation of the relay.

However, in the power supply line switching circuit of PTL 1, there is a problem that, when the power supply line is switched, large current flows through the relay that connects the power supply line and the ground to each other, and the relay is liable to malfunction.

One example of a technique for suppressing surge current when a power supply path is switched is disclosed in PTL 2. Description is made on a configuration of a submarine branching device of PTL 2, in which attention is paid to a contact of one relay connected to a seawater ground, and a control means for the relay is omitted.

Each of FIGS. 5A and 5B is a schematic diagram illustrating one example of a configuration of the submarine branching device of PTL 2. A BU 200 is connected to a terminal A, a terminal B, and a terminal C via cables 310, 320, and 330, respectively. The BU 200 is connected to a seawater ground (hereinafter, referred to as "sea earth" or "SE") 340. To the BU 200, electric power is supplied from the terminal A, the terminal B, or the terminal C. To the cables 310 and 320, positive voltage is supplied from the terminal A, and negative voltage is supplied from the terminal B. To the cable 330 between the terminal C and the BU 200, negative voltage is supplied from the terminal C. When a power supply path is switched, the BU 200 is able to ground a partial circuit of the BU 200 to the SE 340 or un-ground a partial circuit of the BU 200 from the SE 340. FIG. 5A illustrates a state where electric power is supplied to the BU 200 by the terminal A and the terminal B. Further, FIG. 5B illustrates a state where electric power is supplied to the BU 200 by the terminal A and the terminal C.

Each of FIGS. 6A and 6B is a diagram for illustrating an operation of a grounding circuit connected to the BU 200. Specifically, FIG. 6A illustrates a state where the BU 200 has been un-grounded, and FIG. 6B illustrates a state where the BU 200 has been grounded.

The grounding circuit 900 includes a contact (RL contact) of a relay (hereinafter, referred to as "RL") 910, and a resistor 920. One end of the resistor 920 is connected to the SE 340. The other end of the resistor 920 is connected to one end of the RL contact. The other end of the RL contact is connected to the BU 200. The RL contact switches the BU 200 between being grounded and being un-grounded. Note that, the grounding circuit 900 is not included in the BU 200 in FIGS. 6A and 6B in order to make description easily understood, but the grounding circuit 900 may be included in the BU 200. Further, in FIGS. 6A and 6B, a control means for the RL contact is omitted.

Even when the BU 200 is in a state of high electric potential, the grounding circuit 900 is able to suppress, by the resistor 920, surge current flowing through the RL contact when the RL contact is switched and is thereby grounded.

CITATION LIST

Patent Literature

[PTL 1]
Japanese Unexamined Patent Application Publication No. 2003-32155
[PTL 2]
Japanese Unexamined Patent Application Publication No. H4-323917

SUMMARY OF INVENTION

Technical Problem

However, in the technique of PTL 2, there is a problem that arc discharge occurs at the RL contact when the submarine branching device 200 is un-grounded by switching the RL contact. Note that, as a resistance value of the resistor 920 increases, arc discharge becomes more liable to occur at the RL contact, and thus, it is difficult to achieve both suppression of current flowing through the contact of the relay at the time of grounding and suppression of arc discharge across the contact of the relay at the time of un-grounding.

In view of the above-described problems, the present invention has been made, and a main object thereof is to provide a grounding circuit, an electrical device, a grounding control method, and a grounding control program that are able to suppress current flowing through a contact of a relay when a grounded device is grounded by connecting the contact of the relay, and are also able to suppress arc discharge across the contact of the relay when the grounded device is un-grounded by disconnecting the contact of the relay.

Solution to Problem

A grounding circuit according to the present invention includes: a contact of a first relay connected to a grounded device; a resistance being connected between the contact of the first relay and an earth, and suppressing current that flows through the contact of the first relay when the contact of the first relay is closed; and a contact of a second relay being connected in parallel with the resistance, and closed before the contact of the first relay is opened when the grounded device is un-grounded.

An electrical device according to the present invention includes a grounding circuit including: a contact of a first relay connected to a grounded device; a resistance being connected between the contact of the first relay and an earth, and suppressing current that flows through the contact of the first relay when the contact of the first relay is closed; and a contact of a second relay being connected in parallel with the resistance, and closed before the contact of the first relay is opened when the grounded device is un-grounded. The electrical device also includes a control means for opening and closing the contact of the first relay and the contact of the second relay on the basis of a received control signal.

A grounding control method according to the present invention includes: by using a resistance connected between a contact of a first relay connected to a grounded device and an earth, suppressing current that flows through the contact of the first relay when the contact of the first relay is closed; and closing a contact of a second relay connected in parallel with the resistance, before the contact of the first relay is opened when the grounded device is un-grounded.

A grounding control program according to the present invention causes a computer to perform: processing of closing a contact of a first relay connected to a grounded device, while suppressing current that flows through the contact of the first relay by using a resistance connected between the contact of the first relay and an earth; and processing of closing a contact of a second relay connected in parallel with the resistance, before the contact of the first relay is opened when the grounded device is un-grounded.

Advantageous Effects of Invention

According to the present invention, there is an advantageous effect that, when a grounded device is grounded by connecting a contact of a relay, current flowing through the contact of the relay can be suppressed, and when the grounded device is un-grounded by disconnecting the contact of the relay, arc discharge across the contact of the relay can also be suppressed.

Figure 2A:
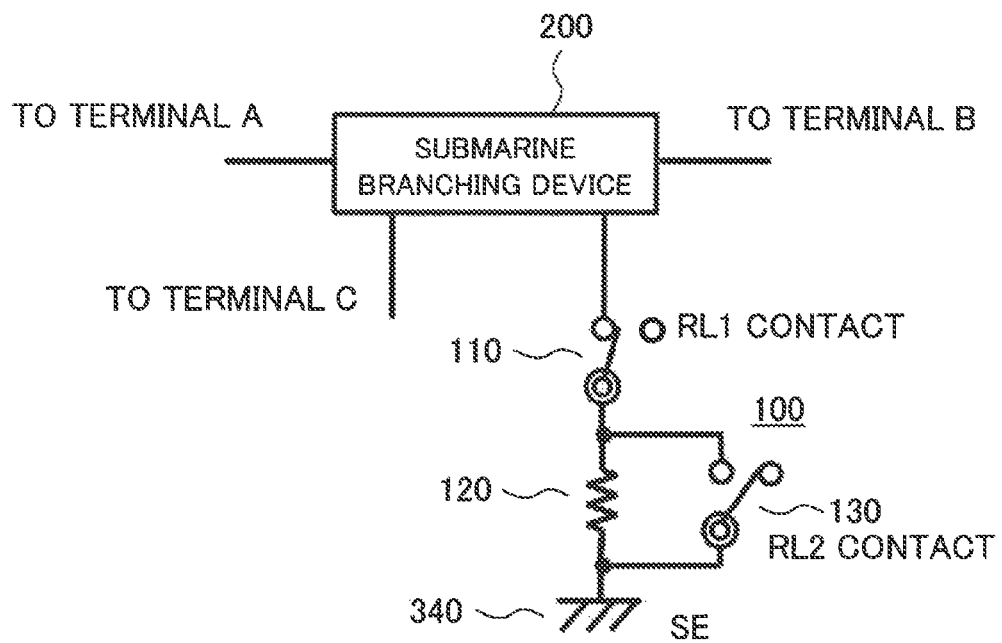
FIGS. 2A and 2B
Figure 2B:
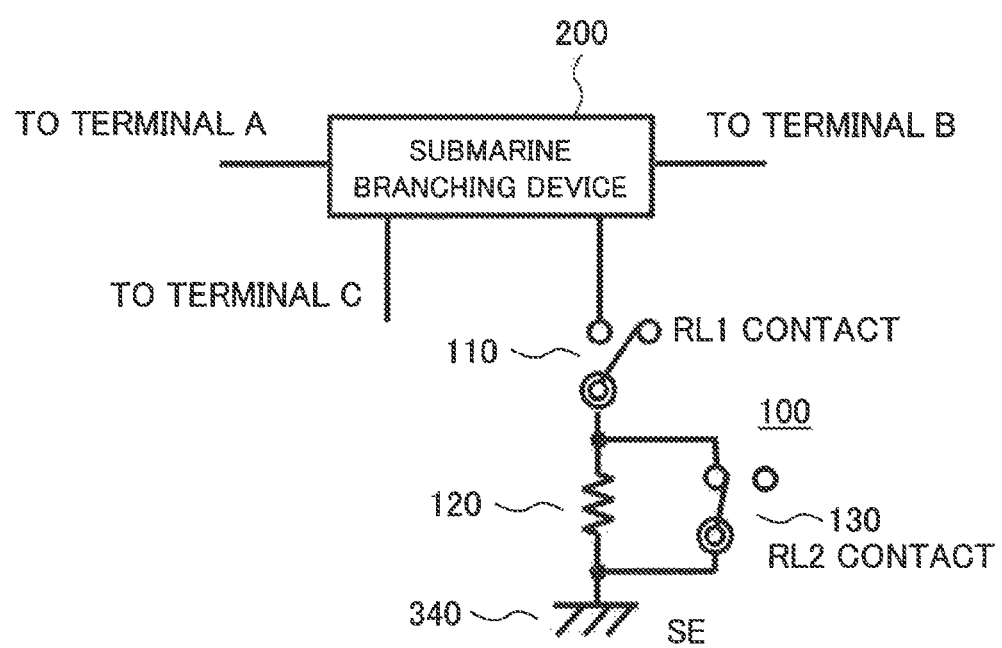

Each of FIGS. 2A and 2B is a diagram for illustrating an operation of the grounding circuit according to the first example embodiment of the present invention.

Figure 3:
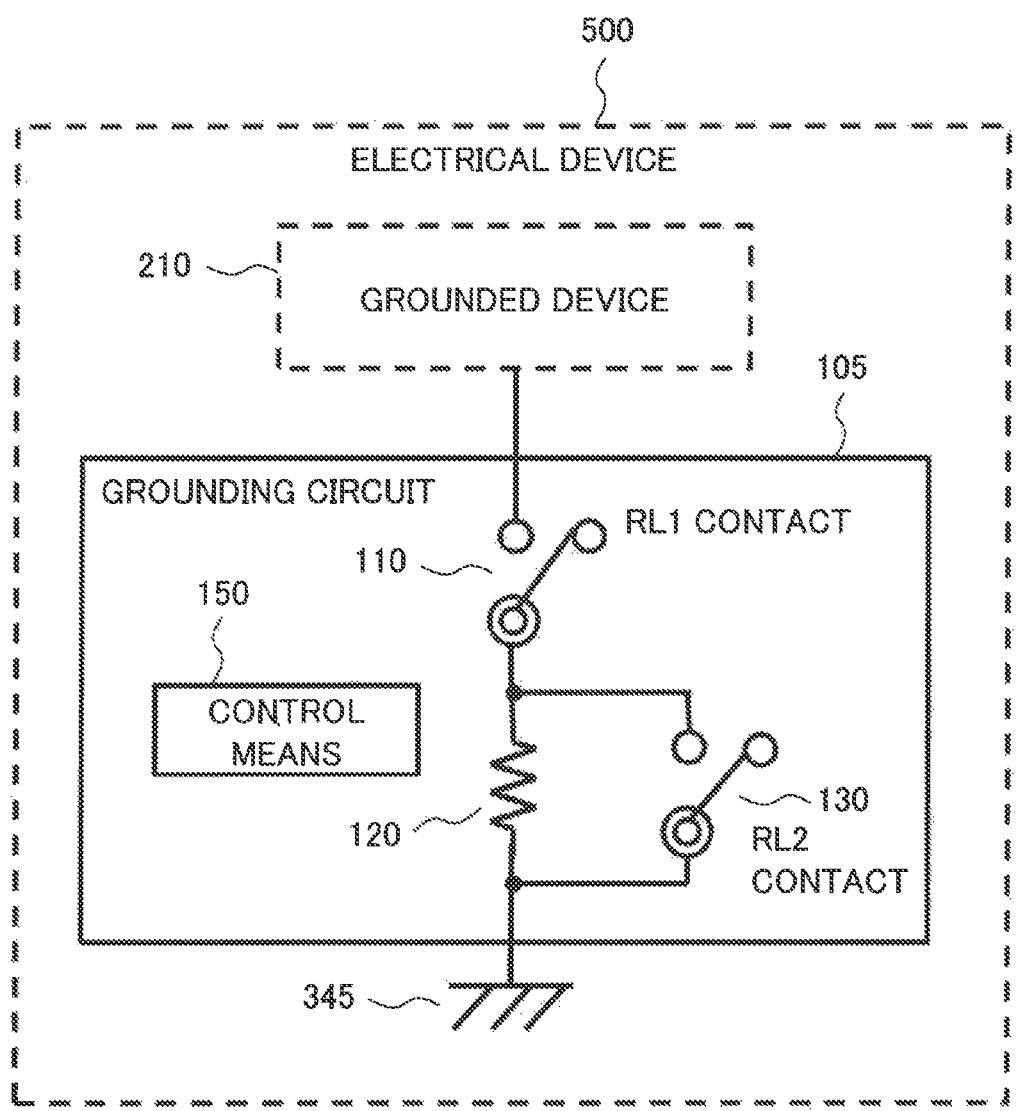

FIG. 3 is a circuit diagram illustrating one example of a configuration of a grounding circuit according to a second example embodiment of the present invention.

Figure 4A:
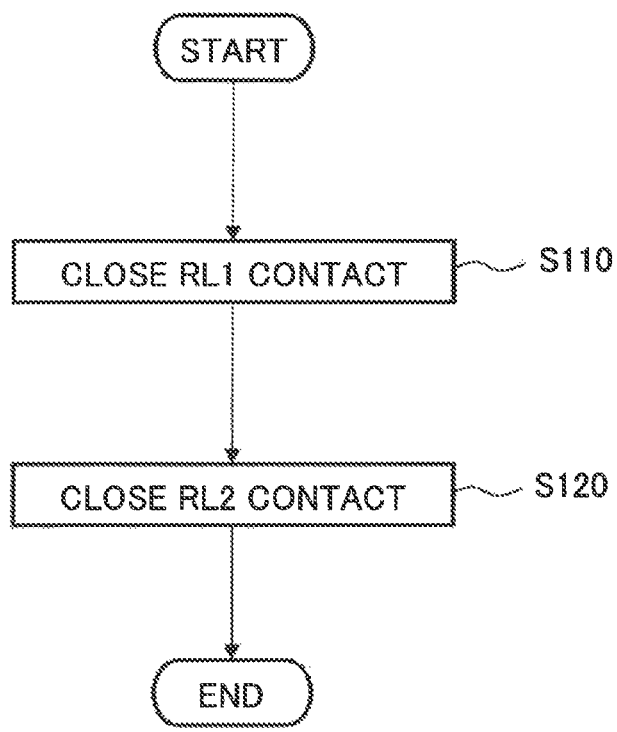
Figure 4B:
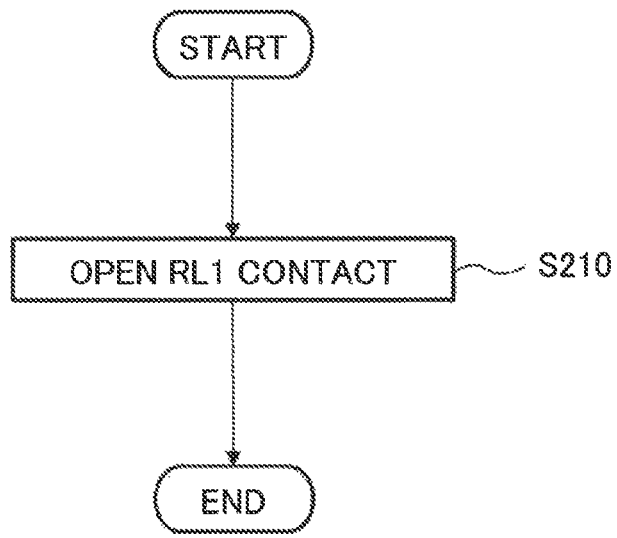

FIGS. 4A and 4B

Each of FIGS. 4A and 4B is a flowchart illustrating an operation of the grounding circuit according to the second example embodiment of the present invention.

Figure 5A:
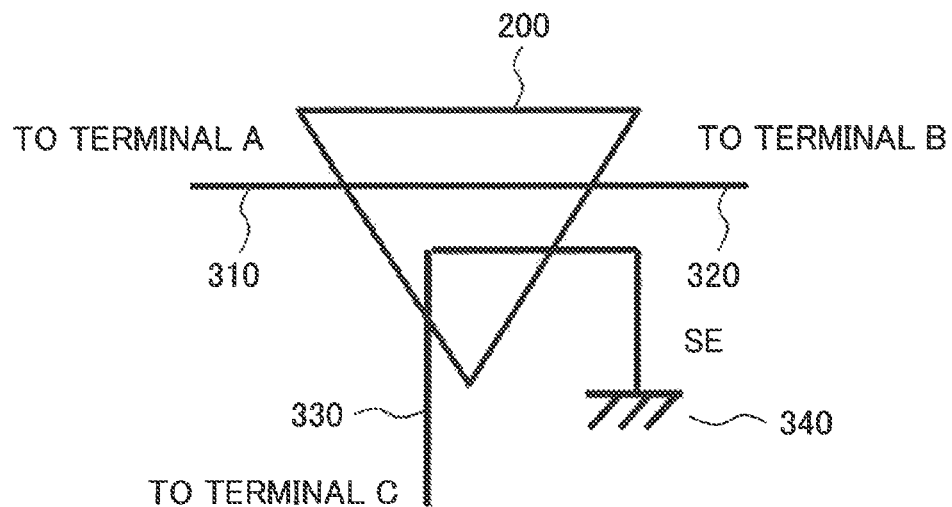
Figure 5B:
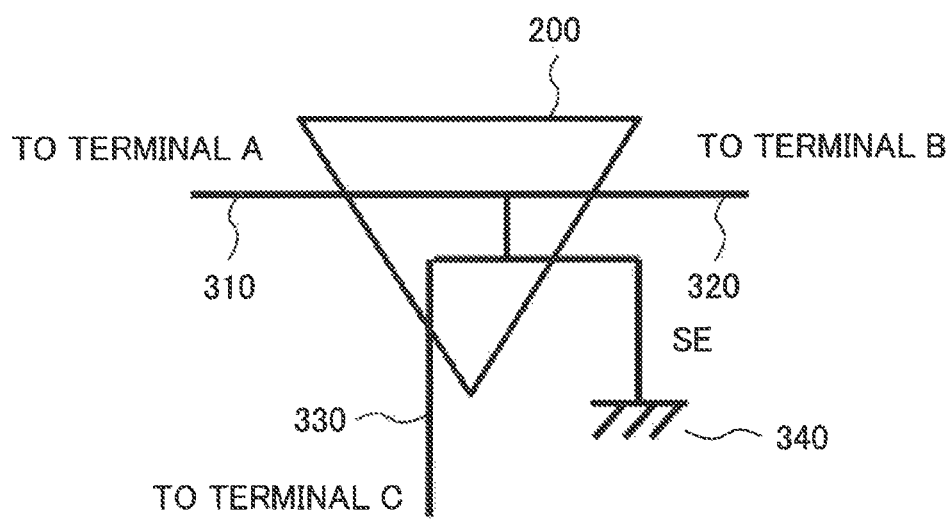

FIGS. 5A and 5B

Each of FIGS. 5A and 5B is a schematic diagram illustrating one example of a configuration of a submarine branching device related to the present invention.

Figure 6A:
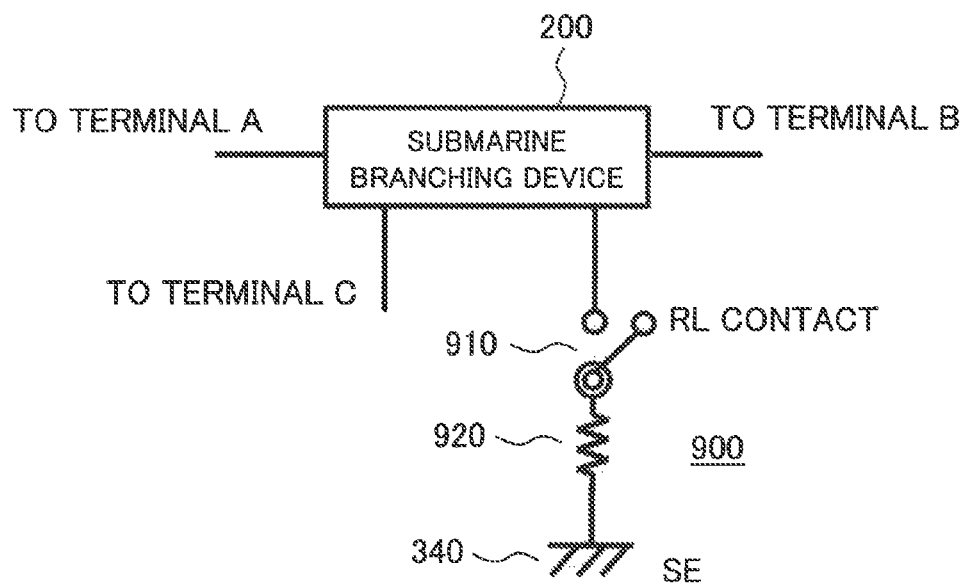
Figure 6B:
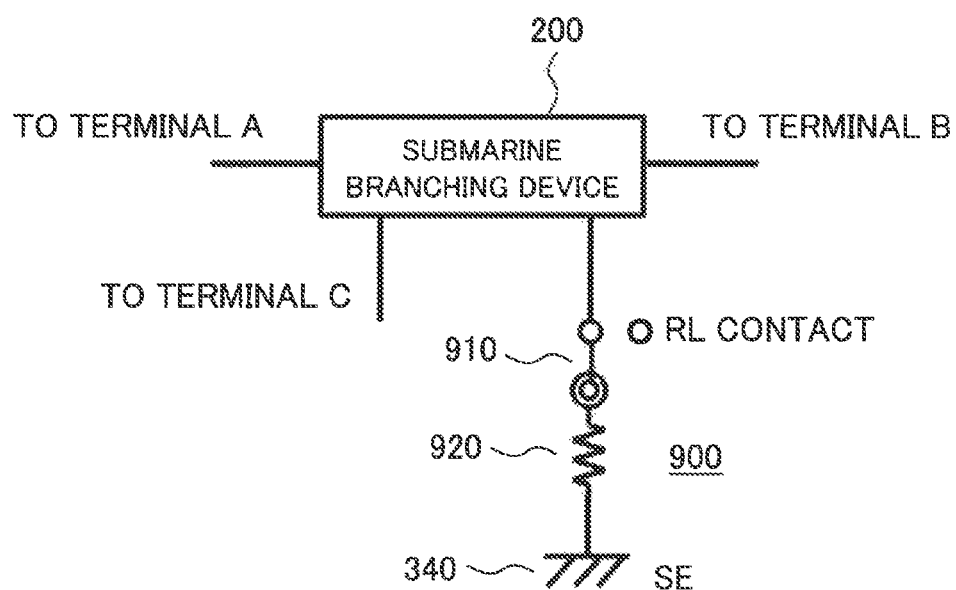

FIGS. 6A and 6B

Each of FIGS. 6A and 6B is a diagram for illustrating an operation of the submarine branching device related to the present invention.

Example Embodiment

Hereinafter, example embodiments of the present invention are described in detail with reference to the drawings. Note that, in all of the drawings, the same reference signs are attached to the equivalent constituent elements, and the description thereof is appropriately omitted.

First Example Embodiment

A configuration of the present example embodiment is described.

Figure 1:
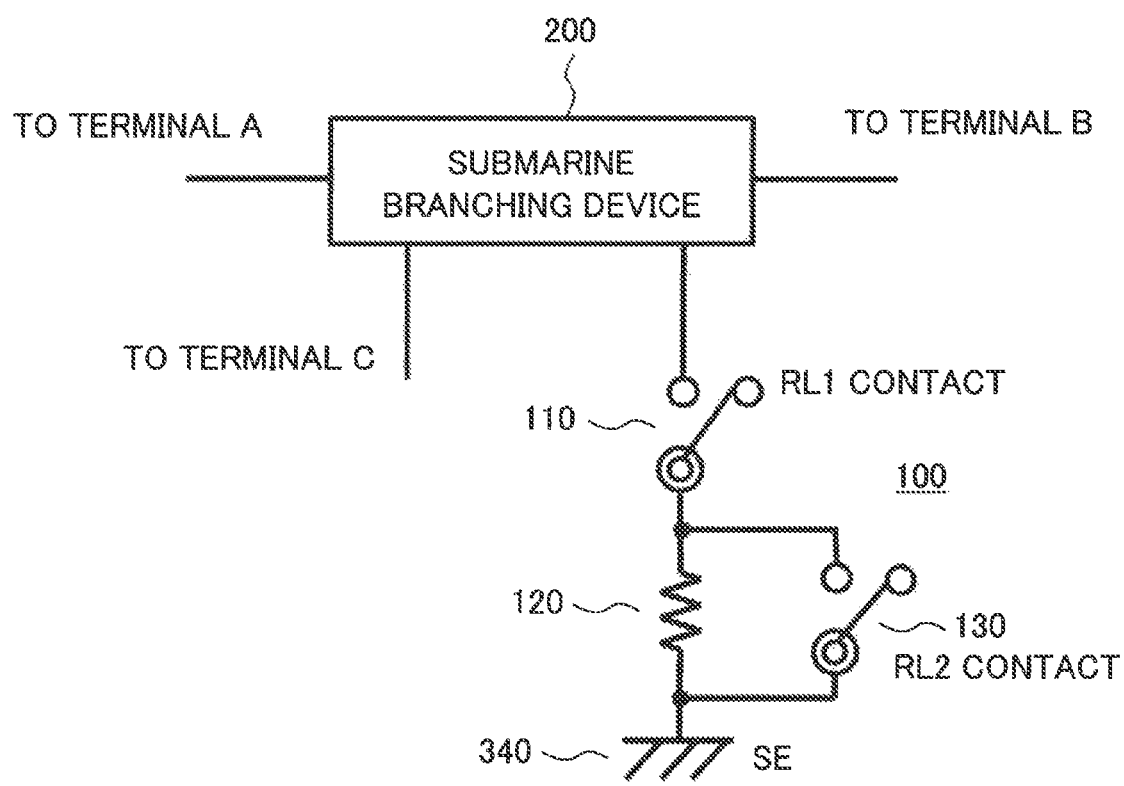
FIG. 1 is a circuit diagram illustrating one example of a configuration of a grounding circuit according to a first example embodiment of the present invention.

FIG. 1 is a circuit diagram illustrating one example of a configuration of a grounding circuit according to a first example embodiment of the present invention.

The grounding circuit 100 is connected between a BU 200 and an SE 340. Note that, the grounding circuit 100 is not included in the BU 200 in FIG. 1 in order to make the description easily understood, but the grounding circuit 100 may be included in the BU 200.

The BU 200 is connected to a terminal A, a terminal B, and a terminal C via cables. Electric power is supplied to the BU 200 from the terminal A, the terminal B, or the terminal C. The grounding circuit 100 includes a contact (RL1 contact) of an RL 110, a resistance 120, and a contact (RL2 contact) of an RL 130. As illustrated in FIG. 1, initial states of the RL1 contact and the RL2 contact are open states. In other words, the RL1 contact and the RL2 contact are make contacts. The RL 110 and RL 130 are each a vacuum relay or a gas filled relay, for example. Note that, in FIG. 1, a control means for the RL1 contact and the RL2 contact is omitted.

One end of the resistance 120 is connected to the SE 340. The other end of the resistance 120 is connected to one end of the RL1 contact. The other end of the RL1 contact is connected to the submarine branching device 200. The RL1 contact switches the submarine branching device 200 between being grounded and being un-grounded.

The RL2 contact is connected in parallel with the resistance 120.

An operation of the present example embodiment is described.

Each of FIGS. 2A and 2B is a diagram for illustrating an operation of the grounding circuit 100 according to the first example embodiment of the present invention. Specifically, (A) FIG. 2A illustrates a state at the time of starting to ground the BU 200, and FIG. 2B illustrates a state at the time of starting to un-ground the BU 200.

When the BU 200 is grounded to the SE 340, first, the RL2 contact is opened. Next, the RL1 contact is closed, and thereby, the BU 200 and the SE 340 are connected to each other via the resistance 120 (FIG. 2A). At this time, the BU 200 is momentarily grounded to the SE 340 and causes large current to flow through the RL1 contact, but such current is suppressed by the resistance 120 between the SE 340 and the RL1 contact. After the flow of the large current to the RL1 contact calms down, the RL2 contact is closed, and thereby, the BU 200 and the SE 340 are electrically connected directly to each other.

Meanwhile, when the BU 200 is un-grounded, in the case where the RL2 contact is open for some reason, first, the RL2 contact is closed, and thereby the resistance 120 is short-circuited. Next, the RL1 contact is opened, and the BU 200 is un-grounded (FIG. 2B). When a voltage at the RL1 contact is high, arc discharge occurs at the RL1 contact when the RL1 contact is opened. However, by closing the RL2 contact, a voltage at the RL1 contact becomes 0 V, and thus, arc discharge does not occur at the RL1 contact. Accordingly, the RL1 contact is unlikely to malfunction.

As described above, the grounding circuit 100 according to the present example embodiment includes the resistance 120 between the RL1 contact and the SE 340, and the RL2 contact connected in parallel with the resistance 120. When the BU 200 is grounded to the SE 340, current flowing through the RL1 contact is suppressed by the resistance 120. Further, when the BU 200 is un-grounded, the resistance 120 is short-circuited by the RL2 contact. A voltage at the RL1 contact becomes 0 V, and thus a potential difference does not occur across the RL1 contact at the moment the RL1 contact is opened, and arc discharge does not occur at the RL1 contact. Accordingly, the grounding circuit 100 according to the present example embodiment achieves an advantageous effect of, when the grounded device is grounded by connecting the contact of the relay, suppressing current flowing through the contact of the relay, and further, when the grounded device is un-grounded by disconnecting the contact of the relay, suppressing arc discharge across the contact of the relay.

In grounding control for a submarine branching device, since arc discharge occurring at a contact of an RL causes malfunction of the RL, a complicated procedure has been required in some cases in order to suppress the arc discharge. However, in the grounding circuit 100 according to the present example embodiment, the arc discharge at the time of un-grounding is suppressed. Accordingly, the grounding circuit 100 according to the present example embodiment achieves an advantageous effect that a complicated grounding control procedure is unnecessary.

Second Example Embodiment

Next, a second example embodiment of the present invention including the first example embodiment of the present invention is described.

A configuration of the present example embodiment is described.

FIG. 3 is a circuit diagram illustrating one example of a configuration of a grounding circuit according to the second example embodiment of the present invention.

The grounding circuit 105 is connected between a grounded device 210 and an earth 345. Note that, the grounding circuit 105 is not included in the grounded device 210 in FIG. 3 in order to make the description easily understood, but the grounding circuit 105 may be included in the grounded device 210.

The earth 345 is, for example, an SE, or a ground to land.

The grounded device 210 is any electrical circuit that needs to be grounded and be un-grounded. The grounded device 210 may be a single device, but may be connected to one or more other devices via cables or the like. In the latter case, the grounded device 210 may communicate with one or more other devices via cables or the like, or may receive electric power from one or more other devices via cables or the like. The grounded device 210 may include a sensor, and may transmit data measured by the sensor to another device. The grounded device 210 is, for example, a submarine branching device, a submarine repeater, a gain equalization device, a submarine seismograph device, or a tidal wave gauge device.

The grounding circuit 105 and the grounded device 210 may be implemented as an integrated electrical device 500. The grounding circuit 105 includes a contact (RL1 contact) of an RL 110, a resistance 120, a contact (RL2 contact) of an RL 130, and a control means 150.

One end of the resistance 120 is connected to the earth 345. The other end of the resistance 120 is connected to one end of the RL1 contact. The other end of the RL1 contact is connected to the grounded device 210. The RL1 contact switches the grounded device 210 between being grounded and being un-grounded.

The RL2 contact is connected in parallel with the resistance 120.

The control means 150 controls opening and closing of the RL1 contact and the RL2 contact on the basis of a control signal for controlling opening and closing of the RL1 contact and the RL2 contact. The control signal may be received from the grounded device 210, or may be received from another device via the grounded device 210. As the control signal, a control signal received from the grounded device 210 or another device may be used (hereinafter, referred to as "remote control type"), or power supply current from the grounded device 210 or another device may be used (hereinafter, referred to as "power supply current control type").

An operation of the present example embodiment is described.

Each of FIGS. 4A and 4B is a flowchart illustrating an operation of the grounding circuit according to the second example embodiment of the present invention. Specifically, FIG. 4A illustrates the operation when the grounded device 210 is grounded, and FIG. 4B illustrates the operation when the grounded device 210 is un-grounded. Note that, the flowchart illustrated in FIGS. 4A and 4B and the following description is merely one example, and depending on a required process, appropriately, the processing order or the like may be changed, process return may be performed, or a process may be repeated.

A case where the grounded device 210 is grounded to the earth 345 is described.

First, it is assumed that the RL1 contact and the RL2 contact are in initial states. In other words, it is assumed that the RL2 contact is opened in advance. When the RL2 contact is not open, the control means 150 opens the RL2 contact.

Next, the control means 150 closes the RL1 contact (step S110). Thereby, the grounded device 210 and the earth 345 are connected to each other via the resistance 120. At this time, potential at the grounded device 210 is momentarily grounded to the earth 345 and causes a large current to flow to the RL1 contact, but such current is suppressed by the resistance 120 between the earth 345 and the RL1 contact.

Subsequently, after a lapse of time required for calming-down the flow of the large current to the RL1 contact, the control means 150 closes the RL2 contact (step S120). Thereby, the grounded device 210 and the earth 345 are electrically connected directly to each other.

A case where the grounded device 210 is un-grounded is described.

First, it is assumed that the grounding circuit 105 is in a state where the step S120 has been performed. In other words, it is assumed that the RL2 contact is closed in advance. When the RL2 contact has not been closed, the control means 150 closes the RL2 contact.

Next, the control means 150 opens the RL1 contact (step S210). Thereby, the grounded device 210 is un-grounded. When a voltage at the RL1 contact is high, arc discharge occurs at the RL1 contact when the RL1 contact is opened. However, since the RL2 contact has been closed, a voltage at the RL1 contact is 0 V, and arc discharge does not occur at the RL1 contact. Accordingly, the RL1 contact is unlikely to malfunction.

Subsequently, the control means 150 may open the RL2 contact. Thereby, the RL1 contact and the RL2 contact return to the initial states.

As described above, the grounding circuit 105 according to the present example embodiment includes the resistance 120 positioned between the RL1 contact and the earth 345, and the RL2 contact connected in parallel with the resistance 120. When the grounded device 210 is grounded to the earth 345, current flowing through the RL1 contact is suppressed by the resistance 120. Further, when the grounded device 210 is un-grounded, the resistance 120 is short-circuited by the RL2 contact. A voltage at the RL1 contact becomes 0 V, and thus, a potential difference does not occur across the RL1 contact at the moment the RL1 contact is opened, and arc discharge does not occur at the RL1 contact. Accordingly, the grounding circuit 105 according to the present example embodiment achieves an advantageous effect that when the grounded device is grounded by connecting the contact of the relay, current flowing through the contact of the relay can be suppressed, and further, when the grounded device is un-grounded by disconnecting the contact of the relay, arc discharge across the contact of the relay can be also suppressed.

In grounding control for the grounded device, arc discharge occurring at the contact of the relay causes malfunction of the relay, and for this reason, a complicated procedure has been required in some cases in order to suppress the arc discharge. However, in the grounding circuit 105 according to the present example embodiment, arc discharge at the time of un-grounding is suppressed. Therefore, the grounding circuit 105 according to the present example embodiment achieves an advantageous effect that a complicated grounding control procedure is unnecessary.

As described above, the control means 150 may be of a power supply current control type, or may be of a remote control type. In the control means 150 of the power supply current control type, a control signal is limited to power supply current, and thus, when electric power is supplied to the grounded device 210 and the grounding circuit 105 from a plurality of (particularly, four or more) external devices, it is not easy to implement the control means 150 of the power supply current control type. However, in the control means 150 of the remote control type, a control signal can be freely defined, and thus, when electric power is supplied to the grounded device 210 and the grounding circuit 105 from a plurality of external devices, it is easy to implement the control means 150 of the remote control type. Accordingly, when the grounding circuit 105 includes the control means 150 of the remote control type, the grounding circuit 105 according to the present example embodiment achieves an advantageous effect that when electric power is supplied to the grounded device 210 and the grounding circuit 105 from a plurality of external devices, it is easy to implement the control means 150 of the remote control type.

The grounding circuit of each of the above-described example embodiments of the present invention may be implemented by a dedicated device, or can be implemented by a computer (information processing device). In this case, the computer reads, to a central processing unit (CPU not illustrated), a software program stored in a memory (not illustrated), executes the read software program in the CPU, and thereby outputs the executed result to a user interface, for example. In the case of each of the above-described example embodiments, description enabling implementation of the function of the above-described control means 150 of the grounding circuit 105 illustrated in FIG. 3 may be made in the software program. However, it is also supposed that the control means 150 of the grounding circuit 105 appropriately includes hardware. In such a case, the software program (computer program) can be regarded as constituting the present invention. Further, a computer readable storage medium that stores the software program can be also regarded as constituting the present invention.

In the above, the present invention is described by exemplifying the above-described respective example embodiments and modified examples thereof. However, the technical scope of the present invention is not limited to the scope described in the above-described respective example embodiments and modified examples thereof. It is apparent for those skilled in the art that various modifications or improvements can be made on the example embodiments. In such a case, a new example embodiment in which such a modification or an improvement is applied can be also included in the technical scope of the present invention. This is apparent from the matters described in claims.

The present application claims priority based on Japanese Patent Application No. 2016-103851 filed on May 25, 2016, the disclosure of which is incorporated herein in its entirety.

A part or all of the above-described example embodiments may be described as in the following supplementary notes, but are not limited to the following.

(Supplementary Note 1)

A grounding circuit including:

a contact of a first relay connected to a grounded device;

a resistance connected between the contact of the first relay and an earth, and suppressing current that flows through the contact of the first relay when the contact of the first relay is closed; and a contact of a second relay connected in parallel with the resistance, and closed before the contact of the first relay is opened when the grounded device is un-grounded.

(Supplementary Note 2)

The grounding circuit according to the supplementary note 1, wherein when the grounded device is un-grounded, in a case where the contact of the second relay is open, the contact of the second relay is closed before the contact of the first relay is opened.

(Supplementary Note 3)

The grounding circuit according to the supplementary note 1 or 2, wherein when the grounded device is grounded, the contact of the second relay is closed after the contact of the first relay is closed and a current flow to the contact of the first relay calms down.

(Supplementary Note 4)

The grounding circuit according to any one of the supplementary notes 1 to 3, wherein
the grounded device is connected to a terminal with a cable, and on the basis of a control signal received from the terminal via the cable, opening and closing of the contact of the first relay and the contact of the second relay is controlled.

(Supplementary Note 5)

The grounding circuit according to the supplementary note 4, wherein electric power is supplied thereto from the terminal via the cable.

(Supplementary Note 6)

The grounding circuit according to the supplementary note 4 or 5, wherein
the grounded device relays communication performed via the cables between or among the two or more terminals.

(Supplementary Note 7)

The grounding circuit according to the supplementary note 4 or 5, wherein
the grounded device includes a sensor, and transmits data measured by the sensor to the terminal via the cable.

(Supplementary Note 8)

The grounding circuit according to any one of the supplementary notes 1 to 7, wherein
the earth is grounded to seawater.

(Supplementary Note 9)

The grounding circuit according to any one of the supplementary notes 1 to 8, wherein
the first relay and the second relay are each a vacuum relay or a gas filled relay.

(Supplementary Note 10)

An electrical device which is provided with:
a grounding circuit that includes
a contact of a first relay connected to a grounded device,
a resistance connected between the contact of the first relay and an earth, and suppressing current that flows through the contact of the first relay when the contact of the first relay is closed, and
a contact of a second relay connected in parallel with the resistance, and closed before the contact of the first relay is opened when the grounded device is un-grounded; and
a control means for opening and closing the contact of the first relay and the contact of the second relay on the basis of a received control signal.

(Supplementary Note 11)

A grounding control method including:
by using a resistance connected between a contact of a first relay connected to a grounded device and an earth, suppressing current that flows through the contact of the first relay when the contact of the first relay is closed; and
closing a contact of a second relay connected in parallel with the resistance, before the contact of the first relay is opened when the grounded device is un-grounded.

(Supplementary Note 12)

A grounding control program causing a computer to perform:
processing of closing a contact of a first relay connected to a grounded device, while suppressing current that flows through the contact of the first relay by using a resistance connected between the contact of the first relay and an earth; and processing of closing a contact of a second relay connected in parallel with the resistance, before the contact of the first relay is opened when the grounded device is un-grounded.

INDUSTRIAL APPLICABILITY

In an electrical device having a function of switching between a grounded state and an un-grounded state, the present invention is able to be used for the purpose of reducing a possibility of malfunction in a contact of a relay for switching between a grounded state and an un-grounded state. The present invention is able to be used for the purpose of grounding control in, for example, a submarine branching device, a submarine repeater, a gain equalization device, a submarine seismograph device, or a tidal wave gauge device.

REFERENCE SIGNS LIST

100, 105, 900 Grounding circuit
110, 130, 910 Relay
120, 920 Resistance
150 Control means
200 Submarine branching device
210 Grounded device
310, 320, 330 Cable
340 Sea earth
345 Earth
500 Electrical device

What is claimed is:
1. A grounding circuit comprising:
a contact of a first relay connected to a grounded device;
a resistance being connected between the contact of the first relay and an earth, and suppressing current that flows through the contact of the first relay when the contact of the first relay is closed; and
a contact of a second relay being connected in parallel with the resistance, and closed before the contact of the first relay is opened when the grounded device is un-grounded.

2. The grounding circuit according to claim 1, wherein, when the grounded device is un-grounded, in a case where the contact of the second relay is opened, the contact of the second relay is closed before the contact of the first relay is opened.

3. The grounding circuit according to claim 2, wherein, when the grounded device is grounded, the contact of the second relay is closed after the contact of the first relay is closed and a current flow to the contact of the first relay calms down.

4. The grounding circuit according to claim 2, wherein the grounded device is connected to a terminal with a cable, and, based on a control signal received from the terminal via the cable, opening and closing of the contact of the first relay and the contact of the second relay is controlled.

5. The grounding circuit according to claim 4, wherein electric power is supplied to the circuit from the terminal via the cable.

6. The grounding circuit according to claim 5, wherein the grounded device relays communication performed via the cables between or among the two or more terminals.

7. An electrical device comprising:
the grounding circuit according to claim 2; and
a controller that is configured to open and close the contact of the first relay and the contact of the second relay, based on a received control signal.

8. The grounding circuit according to claim 1, wherein, when the grounded device is grounded, the contact of the second relay is closed after the contact of the first relay is closed and a current flow to the contact of the first relay calms down.

9. The grounding circuit according to claim 8, wherein the grounded device is connected to a terminal with a cable, and, based on a control signal received from the terminal via the cable, opening and closing of the contact of the first relay and the contact of the second relay is controlled.

10. The grounding circuit according to claim 9, wherein electric power is supplied to the circuit from the terminal via the cable.

11. The grounding circuit according to claim 1, wherein the grounded device is connected to a terminal with a cable, and, based on a control signal received from the terminal via the cable, opening and closing of the contact of the first relay and the contact of the second relay is controlled.

12. The grounding circuit according to claim 11, wherein electric power is supplied to the circuit from the terminal via the cable.

13. The grounding circuit according to claim 4, wherein the grounded device relays communication performed via the cables between or among the two or more terminals.

14. The grounding circuit according to claim 11, wherein the grounded device includes a sensor, and transmits data measured by the sensor to the terminal via the cable.

15. The grounding circuit according to claim 12, wherein the grounded device relays communication performed via the cables between or among the two or more terminals.

16. The grounding circuit according to claim 1, wherein the earth is grounded to seawater.

17. The grounding circuit according to claim 1, wherein the first relay and the second relay are each a vacuum relay or a gas filled relay.

18. An electrical device comprising:
the grounding circuit according to claim 1; and
a controller that is configured to open and close the contact of the first relay and the contact of the second relay, based on a received control signal.

19. A grounding control method comprising:
by using a resistance connected between a contact of a first relay connected to a grounded device and an earth, suppressing current that flows through the contact of the first relay when the contact of the first relay is closed; and
closing a contact of a second relay connected in parallel with the resistance, before the contact of the first relay is opened when the grounded device is un-grounded.

20. A non-transitory storage medium that stores a grounding control program causing a computer to perform:
processing of closing a contact of a first relay connected to a grounded device, while suppressing current that flows through the contact of the first relay by using a resistance connected between the contact of the first relay and an earth; and
processing of closing a contact of a second relay connected in parallel with the resistance, before the contact of the first relay is opened when the grounded device is un-grounded.

* * * * *